Patented Jan. 1, 1929.

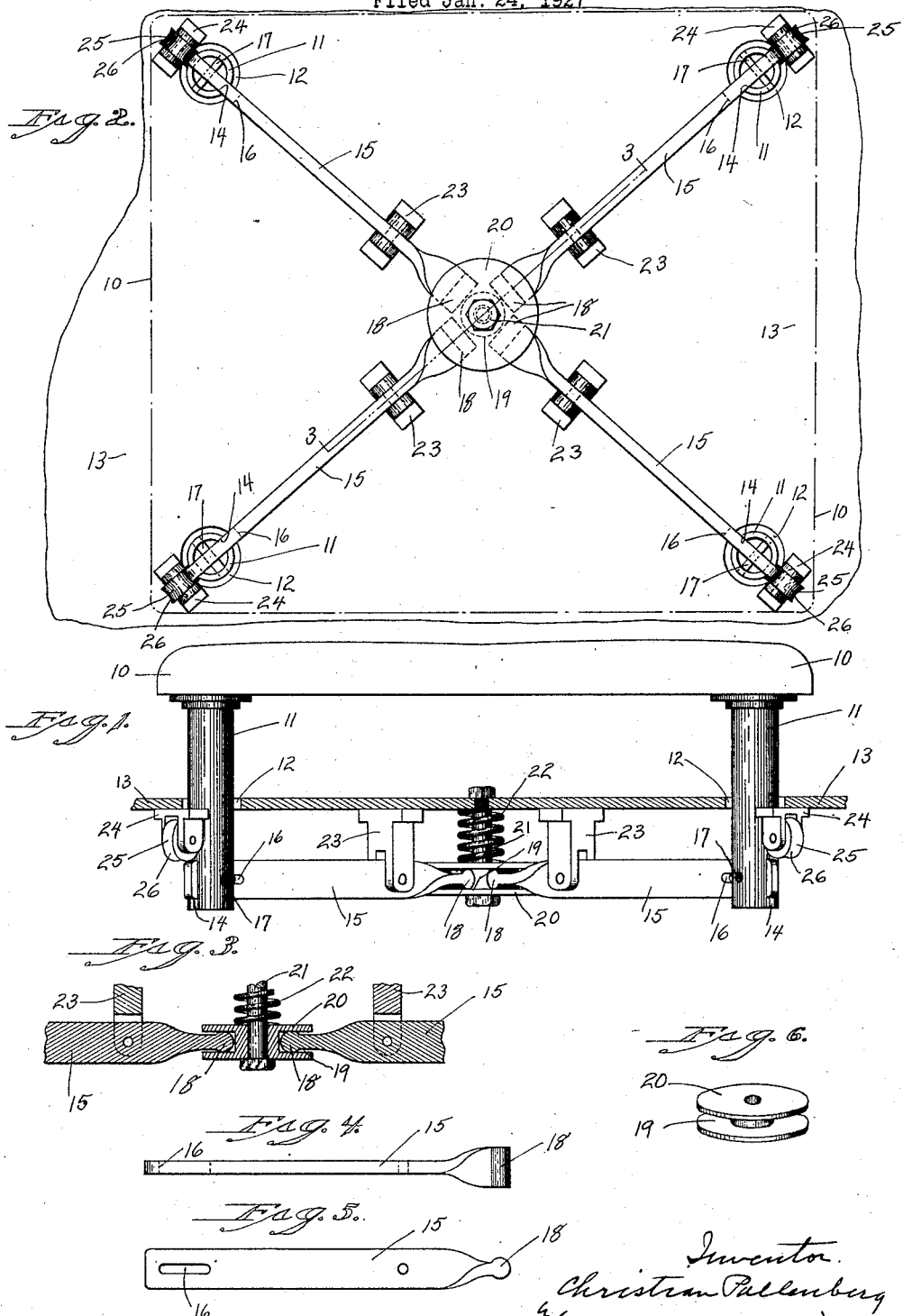

1,697,082

UNITED STATES PATENT OFFICE.

CHRISTIAN PALLENBERG, OF CLINTON, CONNECTICUT, ASSIGNOR OF ONE-HALF TO EMIL PALLENBERG, OF CLINTON, CONNECTICUT.

RESILIENT SEAT MOUNT.

Application filed January 24, 1927. Serial No. 162,999.

This invention relates to an improvement in resilient seat-mounts which are particularly adapted for use in automobiles, but also useful in other situations where a shock-absorbing seat is desirable. The object of this invention is to produce a simple and rugged resilient seat-mount constructed with particular reference to preventing the seat from having undue rocking or lateral movement.

With this object in view, my invention consists in a resilient seat-mount characterized by a plurality of radially-arranged pivotal equalizer-levers which are coupled together at their inner ends to synchronize their movement and which are adapted at their outer ends to be connected to the seat for guiding the same.

In the accompanying drawings:

Fig. 1 is a broken view in front elevation of a seat equipped with my improved resilient mount;

Fig. 2 is a broken underside view thereof;

Fig. 3 is a sectional view on the line 3—3 of Fig. 2;

Fig. 4 is a detached plan view of one of the equalizer-levers detached;

Fig. 5 is a side view thereof; and

Fig. 6 is a detached perspective view of the coupling-spool.

In carrying out my invention, as herein shown, I provide the seat 10 at each of its corners with a vertical guide-post 11 which projects through a clearance-passage 12 in the floor 13 of an automobile or other suitable support. At their lower ends, each of the posts 11 are slotted as at 14 for the reception of the outer end of an equalizer-lever 15 which is provided at its outer end with a horizontal slot 16 receiving a pin 17 passing through it and through the lower end of the guide-post 11.

Each of the equalizer-levers 15 aforesaid is formed at its inner end with a transversely-arranged cylindrical bearing-lug 18 entering the annular groove 19 of a coupling-spool 20 which has vertical movement upon a stud 21 projecting downward from the floor 13 and encircled by a spring 22 for the purpose as will hereinafter appear. Between its ends each of the levers is pivoted to a bracket 23 depending from the floor 13, as clearly shown in Fig. 1.

By means of the parts just described, the downward movement of the seat is yieldingly resisted by the spring 22 and the seat is maintained in a parallel relation with reference to the supporting-surface 13, regardless of the distribution of the weight upon the seat itself.

To prevent the appreciable edgewise movement of the seat in any direction, I mount upon the underside of the floor 13 and adjacent each of the guide-posts 11 a bracket 24 mounting a guide-roller 25 having a slightly-concave face 26 conforming to the curvature of the adjacent guide-posts with which it engages.

I claim:

1. In a resilient seat-mount, the combination with a seat and support therefor, of a plurality of radially-arranged equalizer-levers pivoted between their ends to the said support, cylindrical terminals formed upon the inner ends of the said equalizer-levers, a coupling-spool provided with an annular groove for the reception of the said cylindrical terminals for synchronizing the movement of the said levers, a guide-stud for the said coupling-spool, a spring encircling the said guide-stud and engaging said spool for yieldingly resisting the movement of the seat toward the said support, and vertical guide-posts for connecting the outer ends of the said levers to the said seat.

2. In a resilient seat-mount, the combination with a seat and support therefor, of a plurality of radially-arranged equalizer-levers pivoted between their ends to the said support, cylindrical terminals formed upon the inner ends of the said equalizer-levers, a coupling-spool provided with an annular groove for the reception of the said cylindrical terminals for synchronizing the movement of the said levers, a guide-stud for the said coupling-spool, a spring encircling the said guide-stud and engaging said spool for yieldingly resisting the movement of the seat toward the said support, vertical guide-posts for connecting the outer ends of the said levers to the said seat, guide-rollers secured to the said support and engaging the said vertical guide-posts for preventing the lateral movement of the seat.

3. In a resilient seat-mount, the combination with a seat and support therefor; of four corresponding independently-formed radially-arranged equalizer levers pivoted between their ends to the said support; coupling-means positioned centrally with respect to the said seat for connecting the converging inner ends of the said radial equalizer-levers together for synchronizing their movement; means connecting the outer ends of the said levers respectively to the four corners of the said seat from which they extend radially inward toward the said coupling-means; and means for yieldingly resisting the movement of the seat toward the said support.

4. In a resilient seat-mount, the combination with a seat and support therefor; of four corresponding independently-formed radially-arranged equalizer-levers pivoted between their ends to the said support; coupling-means positioned centrally with respect to the said seat for connecting the converging inner ends of the said radial equalizer-levers together for synchronizing their movement; means connecting the outer ends of the said levers respectively to the four corners of the said seat from which they extend radially inward toward the said coupling-means; and a spring engaging the said coupling-means for yieldingly resisting the movement of the said seat toward the said support.

5. In a resilient seat-mount, the combination with a seat and support therefor; of four corresponding independently-formed radially-arranged equalizer-levers pivoted between their ends to the said support; coupling-means positioned centrally with respect to the said seat for connecting the converging inner ends of the said radial equalizer-levers together for synchronizing their movement; a guide for the said coupling-means; a spring encircling the said guide and engaging the said coupling-means for yieldingly resisting the movement of the seat toward the said support; and means connecting the outer ends of the said levers respectively to the four corners of the seat from which they extend radially inward toward the said coupling-means.

6. In a resilient seat-mount, the combination with a seat and support therefor; of four corresponding independently-formed radially-arranged equalizer-levers pivoted between their ends to the said support; a coupling-spool positioned centrally with respect to the said seat for connecting the converging inner ends of the said equalizer-levers together for synchronizing their movement; a guide-stud for the said coupling-spool; a spring encircling the said guide-stud and engaging the said spool for yieldingly resisting the movement of the seat toward the said support; and means connecting the outer ends of the said levers respectively to the four corners of the said seat from which they extend radially inward toward the said spool.

7. In a resilient seat-mount, the combination with a seat and support therefor; of a vertical guide-stud positioned centrally with respect to the said seat; a coupling-spool having upper and lower flanges and mounted for reciprocation upon the said guide-stud; four independently-formed radially-arranged equalizer-levers pivoted intermediate their ends to the said support and pivoted at their outer ends respectively to the four corners of the said seat from which they extend radially inward toward the said spool between the flanges of which latter their inner ends are entered; and spring means for yieldingly resisting the movement of the said seat toward the said support.

In testimony whereof, I have signed this specification.

CHRISTIAN PALLENBERG.